Oct. 6, 1970  G. J. VIOLLET  3,531,867

MACHINIST'S EXTENSION RANGE

Filed Jan. 15, 1969

Inventor
Gerard Viollet 3,531,867
Patented Oct. 6, 1970

3,531,867
MACHINIST'S EXTENSION RANGE
Gerard J. Viollet, 1619½ W. 134th St.,
Gardena, Calif. 90249
Filed Jan. 15, 1969, Ser. No. 791,346
Int. Cl. G01b 3/32
U.S. Cl. 33—173
7 Claims

ABSTRACT OF THE DISCLOSURE

A machinist's extension range for use either on a machine tool spindle, a tool holder, or height gage, etc. . . . Said extension range comprising on one end an universal slot for holding either a scriber, or an indicator, etc. . . . Said slot is provided in a head member pivotally mounted by connecting rods to a multishanks turret having a multiple rectangular and round shanks, whereby said scriber or indicator can be adjusted to position desired.

---

My invention relates to a multipurpose extension range to be used by machinists, tool and die and mold and pattern makers, inspectors, and to be used preferably in a machine shop.

Frequently it is necessary to measure, scribe, indicate parts beyond the normal range or reach of a height gage, in either horizontal, or vertical, or any angle desired.

It is also necessary on a milling machine or machine tool, to line up the head of the machine as per its table; or center and locate a portion of a part as per machine spindle; or align a layout of a part as per machine ways; or measure distances.

Any time a lathe operator needs to indicate, align, check a part and device mounted on an engine lathe.

Machine shop and laboratory work often requires to check, indicate, align, locate, scribe, inspect, measure in tight spots or under or above a shoulder of a part or in a cavity, etc. . . . In general, in easy and hard to reach places.

Different instruments have to be fastened one way or the other by the machinist or operator; such instruments are preferably scribers, indicators, mirrors, lights, magnifier, or pencils. So I have provided a universal extension range with round and parallelepipedic shanks of different sizes, and with a universal slot to accomplish any of the above-mentioned operations.

Objects of my invention are to provide:

An articulated means which can take any position either frictionally or loose and locked in position.

A means which can be fastened on most tools, tool posts and machines (referred in claims as machinist's tool holders) used by machinists and the like.

A means which can hold most of the instruments used by machinist or the like.

A bent scriber for longer reach.

An extension range which is inexpensive to produce.

An extension range having its members locked in position with only a little effort from the operator.

An universal extension range having members which will not get either loose or tight when moved frictionally.

A means having shanks of different sizes to offer a variety and to fit most machinist's tool holders.

Other and further objects and advantages of my invention will be apparent from the following description thereof and from the claims appended thereto.

In the drawings wherein like numerals refer to like or corresponding parts throughout the several views.

Figure 1:
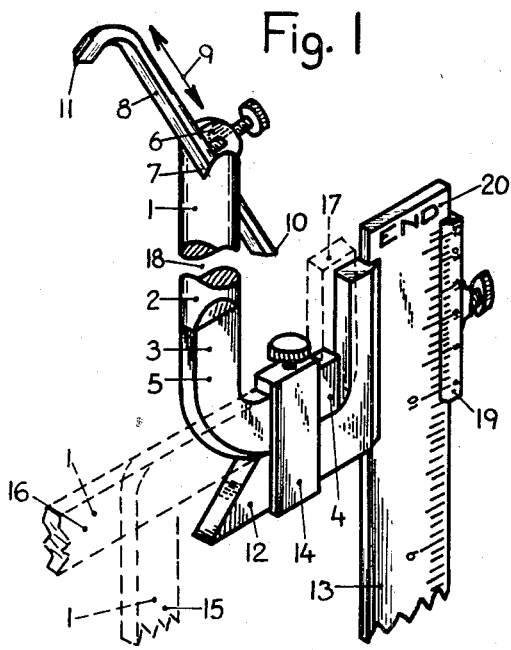
FIG. 1 is a perspective view of an one piece body extension range mounted on a machinist's height gage (only top portion of height gage is shown); on said extension is fastened a scriber having a normal scribing point on one side and a reverse scribing point on its other side.

Referring to the drawings, the numeral 1 designates generally the extension range of FIG. 1, said extension 1 having a body 2 ended on one side with a L-shaped rectangular shank 3, said shank 3 comprising a leg 4 and a leg 5; said body 2 has on its other end an universal slot 6 which offer a V nest 7 in which is fastened a square scriber 8 adjustable as per arrows 9, and said scriber 8 has one end 10 for scribing and another end 11 for opposite scribing, said scriber 8 is reversible. Said L-shaped rectangular shank 3 has its leg 4 fastened on the portion 12 of a machinist's height gage 13 with a height gage standard clamp 14. Said L-shaped rectangular shank 3 can have its leg 4 fastened in an opposite manner and extension 1 will be in a reverse position 15. Said L-shaped rectangular shank 3 can have its other leg 5 fastened on the portion 12 of the machinist's height gage 13 with same clamp 14, extension body 2 will take then an horizontal position 16 and leg 4 a vertical position 17. Body 2 is shown broken in 18 because it can have any desired length depends on the extension desired. When slide 19 of height gage 13 is at the end of height gage beam 20, scriber point 11 stands far above said beam 20 and slide 19. When extension 1 is in the position 16, the scriber point 11 stands far apart from said slide 19.

Figure 2:
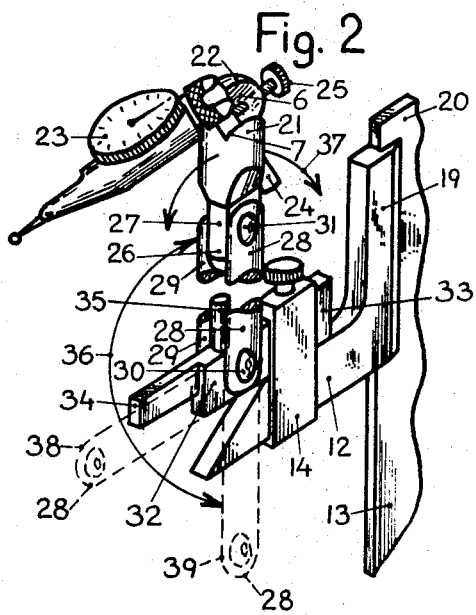
FIG. 2 is a perspective view of an articulated extension range fastened on a machinist's height gage; on said extension is fastened a standard machinist's indicator of the dial test type.
Figure 3:
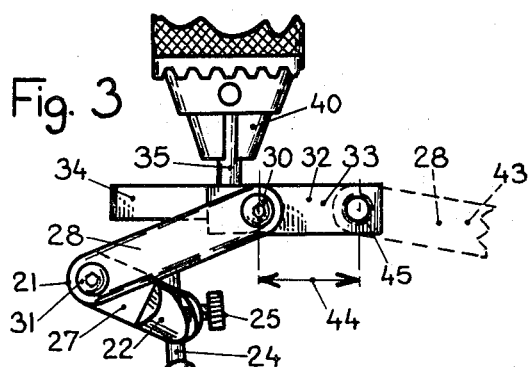
FIG. 3 is a front view of the articulated extension range of FIG. 2, but mounted in a chuck or collet of a machine spindle; on said extension is fastened a machinist's indicator, and said indicator point is indicating the side wall of a hole in a part.

The numeral 21 designates generally the universal extension of FIG. 2, said extension 21 is similar in many ways to extension 1, but it is articulated and more universal; said extension 21 having a head 22 transversed with a universal slot 6 which offer a V nest 7 in which is fastened a machinist's standard dial test indicator 23, said indicator 23 has a shank 24 fastened with a lock screw 25, said shank 24 rests on the V nest 7; other accessories such as scriber 8 etc. . . . can be fastened in slot 6. Said head 22 is ended on one side 26 with a rectangular shank 27 which is fastened with a screw on two connecting rods 28 and 29, said connecting rods are similar, excepted that one rod 28 has clearance holes for screws 30 and 31, and the other rod 29 has threaded holes for screws 30 and 31, and said connecting rods can be quickly substituted with longer ones; said screw 30 transverse a clearance hole in shank 27; and said screws 30 and 31 can tighten firmly extension 21 in position desired; said screws 30 and 31 can also be in the loose side as to permit members of extension 21 to move frictionally; and when members of extension 21 move frictionally, screws 30 and 31 do not get either more tight or more loose, a thing which would not be possible if extension 21 had only one connecting rod 29; said connecting rods 28 and 29 are mounted on a multishanks turret 32 comprising a big rectangular shank 33, a small rectangular shank 34, and one or more cylindrical shank 35; said rectangular shank 33 is fastened on the portion 12 of the machinist's height gage 13 with clamp 14; extension members can move around arrows 36 and 37 to take positions such as 38 and 39 etc. . . . Said multishanks turret 32 can be fastened in an engine lathe tool posts, machine spindles, height gages, etc. . . . The extension 21 of FIG. 2 is also shown in FIG. 3 but cylindrical shank 35 is fastened in a collet or chuck 40 of a machine spindle and indicator 23 lines a hole 41 of a part 42 mounted on the machine; connecting rods can be moved to position 43 as to get a range which is extended by distance 44; said screw 30 transverses freely bigger threaded hole 45; said shank 27 is preferably a little thicker than shank 33 as to permit multishanks turret 32 to pass between connecting rods 28 and 29.

Figure 4:
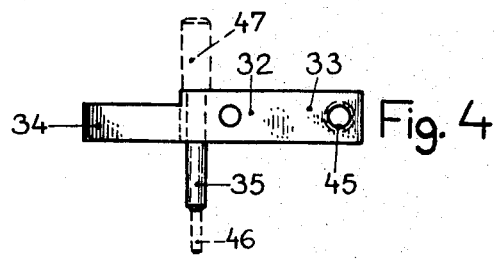
FIG. 4 is a front view of the multishanks turret of extension range of FIG. 2.
Figure 5:
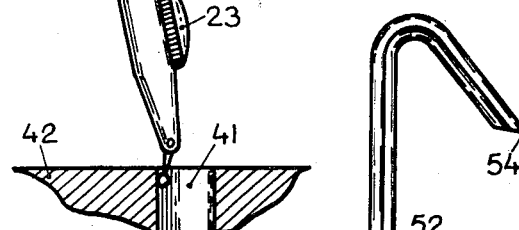
FIG. 5 is a front view of a shank having one round end and one parallelepipedic end; said shank can inexpensively substitute multishanks turret of FIG. 4.

The multishanks turret 32 (FIG. 4) can also have one or more smaller cylindrical shanks 46, and another size shank 47 opposite to shank 35; said multishank turret 32 can be substituted (FIG. 5) with a single rectangular shank 48 having on one of its ends said threaded hole 45, and on its other end a cylindrical shank 49; said shank 48 has a clearance hole 50 for screw 31.

Figure 6:
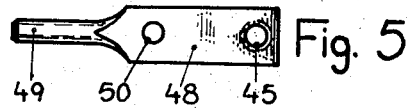
FIG. 6 is a front view of the multishanks turret of FIG. 4, but mounted on a machinist's height gage; said shank holds a machinist's standard dial indicator of gear and rack type.
Figure 7:
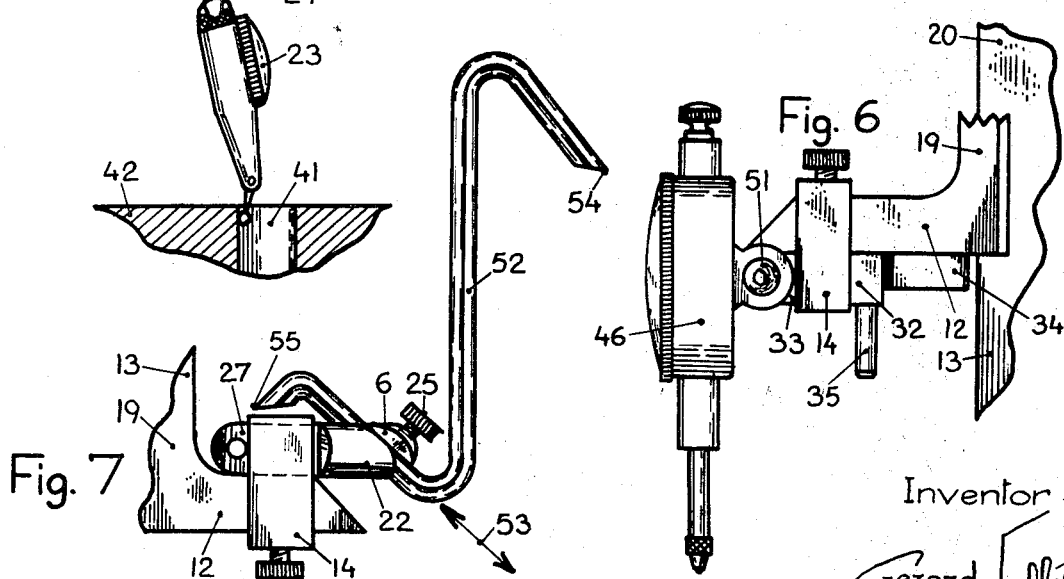
FIG. 7 is a front view of the end piece of the extension range of FIG. 2, but fastened on a machinist's height gage; said end piece having the universal slot in which is fastened a bent square scriber.

A dial indicator 46 (FIG. 6) can be fastened with a screw 51 fitting the threaded hole 45 of the multishanks turret 32 which is fastened on portion 12 of height gage 13 with clamp 14. The head 22 (FIG. 7) can also be fastened on portion 12 of height gage 13 with clamp 14; said head 22 holds a triple bent square scriber 52, and said scriber 52 is adjustable as per arrows 53, and said scriber 52 is reversible as to offer either a normal scribing end 54 or a reverse scribing end 55; said clamp 14 can be in a reverse position to clear scribing ends 54 and 55.

While the foregoing has illustrated and described what is now contemplated to be the best mode of carrying out the invention, the constructions are, of course, subject to modification without departing from the spirit and scope of the invention. It is therefore, not desired to restrict the invention to the particular form of construction illustrated and described, but to cover all modifications that may fall within the scope of the appended claims.

I claim:

1. An extension range for mounting on a tool holder for holding machinist's instruments, comprising a multishanks turret having a rectangular shank and a cylindrical shank in substantially linear alignment, a connecting rod, means for pivotally mounting said rod at one end to said rectangular shank, a head member having rectangular shank portion, means for pivotally mounting said shank portion to the other end of said connecting rod, both said means including means for frictionally holding the rod and head member in place, said head member having at its distal end a universal slot of V form in which machinist's instruments can rest, and a screw in said head member having its axis in the center of the V slot for holding the machinist's instruments in place, whereby said machinist's instrument can be adjusted and fastened in position in a desired position.

2. An extension range as defined in claim 1, wherein said connecting rod comprises first and second rod members in spaced parallel relation with the head member and rectangular shank therebetween.

3. An extension range as defined in claim 2, wherein said pivoting means are screw members.

4. An extension range as defined in claim 1 wherein said multishanks turret has means on the end of the rectangular shank for mounting a dial indicator.

5. An extension range as defined in claim 1 wherein said machinist's instrument is a scriber having a slender body terminating in oppositely extending scribing points.

6. An extension range as defined in claim 5 wherein said rectangular shank portion of said head can be rotated through 180 degrees.

7. An extension range as defined in claim 1 wherein said rectangular shank has a second cylindrical shank extending at right angles thereto and to said first cylindrical shank adapted to be inserted in the chuck of a machine spindle.

References Cited

UNITED STATES PATENTS

| 448,863 | 3/1891 | Neuberth | 33—171 |
| 2,073,089 | 3/1937 | Autenrieth. | |
| 2,456,383 | 12/1948 | Collins. | |
| 2,969,597 | 1/1961 | Groshier. | |
| 3,442,478 | 5/1969 | Parapetti. | |

FOREIGN PATENTS

| 589,563 | 12/1959 | Canada. |
| 509,139 | 10/1930 | Germany. |
| 91,910 | 12/1921 | Switzerland. |
| 248,519 | 2/1948 | Switzerland. |

HARRY N. HAROIAN, Primary Examiner

U.S. Cl. X.R.

33—171